United States Patent [19]
Polley

[11] Patent Number: 5,947,031
[45] Date of Patent: Sep. 7, 1999

[54] RAILWAY TRUCK LEVELING VALVE ARRANGEMENT FOR CLOSER OVERALL HEIGHT CONTROL

[75] Inventor: Richard B Polley, Gahanna, Ohio

[73] Assignee: Buckeye Steel Castings, Columbus, Ohio

[21] Appl. No.: 08/946,276

[22] Filed: Oct. 7, 1997

[51] Int. Cl.⁶ ........................................ B61F 1/00
[52] U.S. Cl. .................... 105/453; 105/199.1; 105/199.2
[58] Field of Search ................ 105/453, 199.1, 105/199.2

[56] References Cited

U.S. PATENT DOCUMENTS

| | | | |
|---|---|---|---|
| 3,439,631 | 4/1969 | Cope | 105/453 |
| 3,941,061 | 3/1976 | Schindehutte et al. | 105/135 |
| 4,091,738 | 5/1978 | Platner | 105/164 |
| 4,546,706 | 10/1985 | Jackson et al. | 105/182 E |
| 4,841,875 | 6/1989 | Corsten et al. | 105/224.05 |
| 4,932,330 | 6/1990 | Herring, Jr. | 105/224.1 |
| 5,588,367 | 12/1996 | Scheffel | 105/168 |

*Primary Examiner*—Mark T. Le
*Assistant Examiner*—Robert J. McCarry, Jr.
*Attorney, Agent, or Firm*—Banner & Witcoff, Ltd.

[57] ABSTRACT

A railway truck leveling valve arrangement for improved railway car floor height control comprises a pneumatic level regulating valve, a rigid, lightweight bar, and a leveling valve linkage. The level regulating valve is connected to and mounted above a secondary air spring suspension. The rigid, lightweight bar extends between the axleboxes of the railway truck wheelsets, the railway truck wheelsets being coupled to a primary suspension. The leveling valve linkage connects the level regulating valve and the rigid bar. The level regulating valve senses spring deflection in both the primary and secondary suspensions and signals the secondary air spring suspension to compensate for both deflections. Consequently, the correction of the overall railway car floor height by the secondary suspension provides more precise car floor to station platform height control.

19 Claims, 1 Drawing Sheet

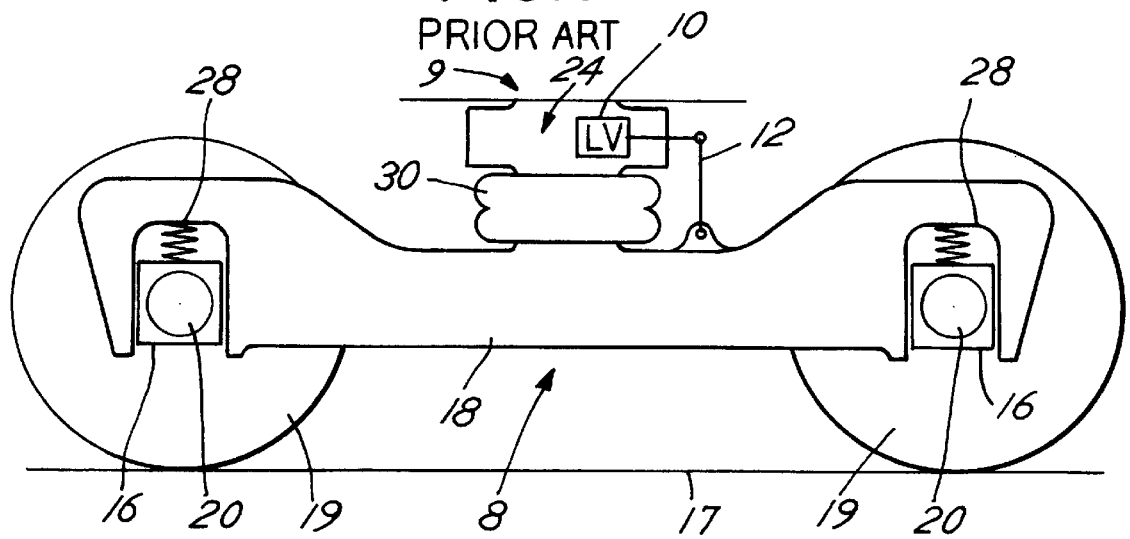
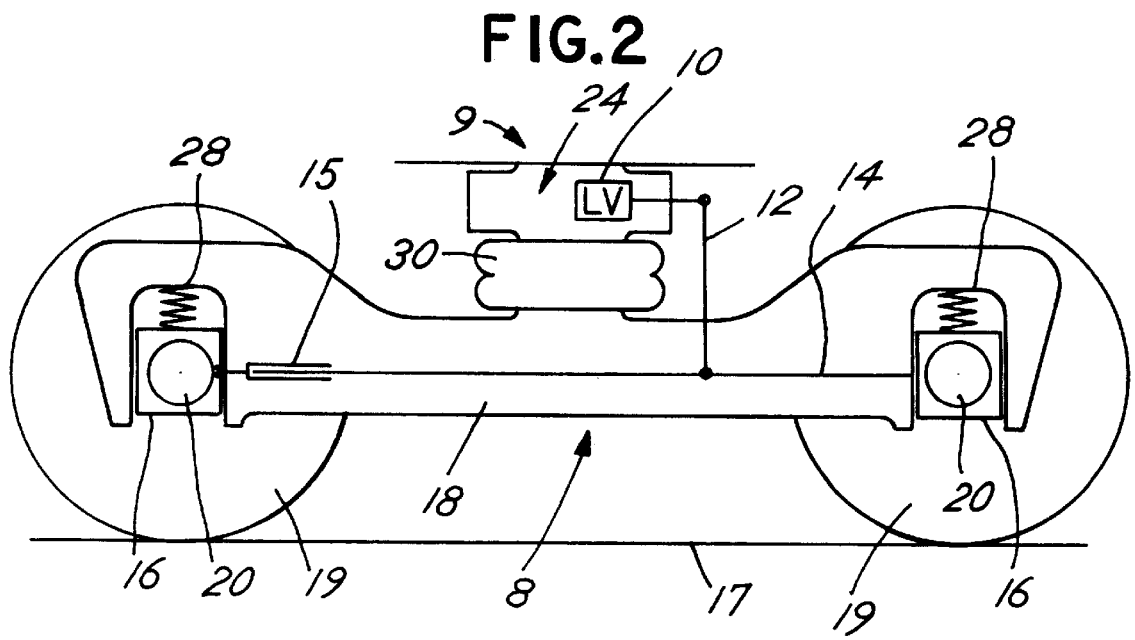

RAILWAY TRUCK LEVELING VALVE ARRANGEMENT FOR CLOSER OVERALL HEIGHT CONTROL

BACKGROUND OF THE INVENTION

1. Field of the Invention

The present invention relates in general to railway car trucks and, in particular, to railway truck air spring suspensions. More specifically, but without restriction to the particular use which is shown and described, this invention relates to railway truck leveling valves which better control the overall height of railcars.

2. Description of the Related Art

It is known that in passenger railway cars, especially for high-speed trains, the use of air springs absorb the track shocks and vibrations of the railway trucks such that the vibrations are not greatly perceptible in the railway car body. It is also known that air spring suspensions on railway trucks attempt to maintain an essentially constant railway car floor height relative to the railroad track and relative to the height of a station platform. The air spring suspensions attempt to maintain this constant floor height over an entire load range, that is, from an empty railway car to a full car. A constant railway floor height, for example, facilitates safer loading and unloading of passengers, especially disabled persons.

U.S. Pat. No. 5,588,367 issued to Scheffel generally teaches railway vehicle suspensions and is incorporated by reference. Typically, a passenger railway truck has both a primary and a secondary suspension system. The secondary suspension generally comprises air springs and provides the majority of the total equivalent spring deflection and is thus the dominant factor in determining passenger ride comfort. The primary suspension generally comprises elastomeric or steel springs and contributes to ride comfort to a lesser degree. The most vital function of the primary suspension is to provide adequate wheel load equalization so the train can safely traverse uneven track.

Conventionally, the air spring height of the secondary suspension is controlled by a pneumatic level regulating valve connected to the air spring. The air spring is disposed between the truck side frame and truck bolster. Air springs are located on each side of the railway truck and it is customary to employ a level regulating valve with each of the air springs. Thus, the air springs for each railway truck maintain constant height and control the railway car floor height above the railway truck frame. As the railway car is loaded or unloaded with passengers, the level regulating valve controls the air pressure in the air springs in accordance with the loading of the car body, such that, as the loading increases, the pressure in the air springs is increased. Similarly, as the loading decreases, air pressure in the air springs is discharged. The increase or decrease in air pressure maintains the constant car floor height above the truck frame. The level regulating valve associated with each air spring will operate independently of the other level regulating valves to admit and exhaust air pressure from its associated air spring. This independent level regulating compensates for uneven loading of the railway car laterally from the longitudinal center line of the railway car. This insures that the railcar door threshold is maintained somewhat level with the station platform thus facilitating safe entry and egress of passengers.

While adequately measuring and compensating for the height of the railway car above the truck frame, the level regulating valve ignores the smaller deflections occurring in the primary suspension resulting from variations in the weight and uneven weight distribution of the railway car. That is, while the secondary suspension compensates for the loading of the railway cars in maintaining a constant railway car floor height above the level of the truck frame, the conventional suspension arrangements do not account for primary suspension deflections below the level of the truck frame. This is undesirable especially for passenger railway cars because vertical spring deflections and tilting of the car body leads to an uneven car floor height in relation to the railroad station platform. Under such conditions, it can be hazardous when passengers board and deboard the railway car, especially passengers with disabilities.

SUMMARY OF THE INVENTION

The present invention recognizes and provides a solution to the problems of maintain a constant railway car floor height between the car floor and the railroad track and over the entire railway car load range, that is, from an empty railway car to a full railway car. Accordingly, an object of the present invention is to provide for the correction of the overall railway car floor height. Another object of the present invention is to provide for more precise control of car floor height relative to station platform height. Still another object of the invention is to measure the total spring deflection of the primary and secondary suspensions. Yet another object of the invention is to measure the total spring deflection of the primary and secondary suspensions and compensate for both.

Briefly, in summary, the present invention provides a railway truck leveling valve arrangement for improved railway car floor height control comprising a pneumatic level regulating valve, a rigid bar, and a leveling valve linkage. The level regulating valve is connected to and mounted above a secondary suspension. The rigid, lightweight bar extends between the axleboxes of the railway truck wheelsets, the railway truck wheelsets being positioned below a primary suspension. The leveling valve linkage connects the level regulating valve and the rigid bar. As now contemplated and preferred, the level regulating valve senses spring deflection in both the primary and secondary suspensions and signals the secondary suspension to compensate for both deflections. Consequently, the correction of the overall car floor height by the secondary suspension provides more precise car floor to station platform height control.

The full range of objects, aspects and advantages of the invention are only appreciated by a full reading of this specification and a full understanding of the invention. Therefore, to complete this specification, a detailed description of the invention and the preferred embodiment follows, after a brief description of the drawing.

BRIEF DESCRIPTION OF THE DRAWINGS

The preferred embodiment of the invention will be described in relation to the accompanying drawings. In the drawings, the following figures have the following general nature:

FIG. 1 is a side view of a prior art railway truck, incorporating a conventional leveling valve arrangement.

FIG. 2 is a side view of a railway truck leveling valve arrangement of the present invention.

In the accompanying drawings, like reference numerals are used throughout the various figures for identical structures.

DESCRIPTION OF THE PREFERRED EMBODIMENTS

Referring to FIG. 1, a prior art railway truck 8 is shown mounted on railroad track 17. As known to persons of ordinary skill in the art, the railway truck 8 includes a truck frame 18 mounted on at least two wheelsets 19. Each wheelset 19 includes an axle 20 having axle ends mounted in respective axleboxes 16. The truck frame 18 underlies and supports a truck bolster 24. The truck frame 18 and truck bolster 24 are suspended on the wheelsets 19 by a primary suspension 28. The primary suspension 28 provides wheel load equalization to allow the railway car to traverse uneven track. The primary suspension 28 comprises spring means for each wheelset 19. The spring means are typically an elastomeric or steel spring located adjacent the end of each axle 20 of each wheelset 19 and positioned between the axlebox 16 and the truck frame 18.

A railway car body 9 is pivotally positioned above the truck bolster 24 and is supported by a secondary suspension 30. The secondary suspension 30, in passenger railway cars, typically comprises an air spring positioned between each truck bolster end 24 and the truck frame 18. The secondary suspension 30 not only supports the weight of the railway car body, but also provides for passenger ride comfort. The air springs of the secondary suspension 30 for passenger railcars are controlled by a pneumatic level regulating valve 10 which is connected to and located above the air spring 30. The level regulating valve 10 is connected to the truck frame 18 by the leveling valve linkage 12 and by this means senses the height of the air spring 30. The level regulating valve 10 controls the air pressure in the air springs in accordance with the loading of the car body, such that, as the loading of the car body increases, the level regulating valve increases the spring pressure accordingly. Likewise, as the loading of the car body decreases, the air pressure in the air springs is decreased. This increase and decrease in air pressure results in passenger ride comfort and keeps the floor of the car body at a relatively constant height above the railway truck frame by maintaining a constant air spring height under varying static loading conditions.

Referring to FIG. 2, a preferred railway truck leveling valve arrangement of the present invention is illustrated and comprises a level regulating valve 10, a leveling valve linkage 12 and a bar or rod 14 connected between a pair of axleboxes 16. As preferred, the railway truck leveling arrangement includes the bar 14 which preferably is rigid and is mounted between the axleboxes 16. That is, the rigid bar 14 attaches to the axlebox 16 of one wheelset and also to the axlebox 16 of the other wheelset on the same side of the truck frame. The rigid bar 14 is mounted to the axleboxes 16 so that the bar 14 is substantially horizontal and thus substantially parallel to the horizontal plane of the track 17. Note that the rigid bar 14 may be connected to other unsprung elements of the wheelset. The rigid bar 14 may include a telescoping sleeve device 15 to accomodate small longitudinal relative motion between the axleboxes 16 which may occur in service.

Attached perpendicular to the rigid bar 14, at approximately the midpoint of the rigid bar 14, is the leveling valve linkage 12 which couples the rigid bar 14 to the level regulating valve 10. The railway truck leveling arrangement may be mounted on each side of a railway truck. Alternatively, there may be only one leveling arrangement controlling both air springs of a given truck.

In operation, as the railway car receives varying degrees of passenger load and the load is distributed in random patterns across the car floor, the truck primary and secondary suspensions react by deflecting at each location proportional to the load supported at that corner of the car. This in turn causes either tilting of the car body or uneven car floor height in relation to a railroad station platform, or both. Vertical misalignment between the car door threshold and the station platform is the result.

The rigid bar 14 being attached to the axleboxes 16 of the wheelsets 19 follows the vertical motion of the wheelsets 19. The leveling valve linkage 12 in turn transmits this vertical motion to the level regulating valve 10 which senses the amount of vertical deflection in the rigid rod 14, which directly corresponds to the total vertical deflection in the primary suspension 28 and the secondary suspension 30. The level regulating valve 10 may then adjust the air pressure in the air springs of the secondary suspension 30 to compensate for the total deflection incurred by the primary suspension 28 and the secondary suspension 30 caused by the varying and unbalanced loading. Consequently, the car floor height of the railway car body is better controlled because both the deflection in the primary and secondary suspensions are compensated for.

In essence, the level regulating valve 10 senses both the spring deflection of the secondary air spring and spring deflection of the primary elastomeric or steel springs via the bar 14 mounted between the axleboxes 16 and signals the secondary suspension 30 to correct the total deflection, thereby correcting the railway car floor height.

The preferred embodiments of the invention are now described as to enable a person of ordinary skill in the art to make and use the same. Variations of the preferred embodiment are possible without being outside the scope of the present invention. Therefore, to particularly point out and distinctly claim the subject matter regarded as the invention, the following claims conclude the specification.

What is claimed is:

1. A railway truck leveling valve arrangement for improved railway car height control comprising:

a level regulating valve connected to a secondary suspension, a bar having ends attached to unsprung elements of a pair of railway truck wheelsets, the railway truck wheelsets positioned below a primary suspension, and a leveling valve linkage connecting the level regulating valve and the bar, whereby the level regulating valve senses deflection in both the primary and secondary suspensions and signals the secondary suspension to compensate for both deflections, thereby correcting the railway car height.

2. The railway truck leveling valve arrangement as in claim 1 wherein the secondary suspension is an air spring for supporting a railway car body and is mounted between a railway truck frame and a railway truck bolster.

3. The railway truck leveling valve arrangement as in claim 1 wherein the secondary suspension is an elastomeric spring disposed between a railway truck frame and an axlebox of the railway truck wheelset for providing wheel load equalization and shock absorption of forces caused by the railway car traversing uneven railroad track.

4. The railway truck leveling valve arrangement as in claim 1 wherein the primary suspension is a steel spring disposed between a railway truck frame and an axlebox of the railway truck wheelset for providing wheel load equalization and shock absorption of forces caused by the railway car traversing uneven railroad track.

5. The railway truck leveling valve arrangement as in claim 1 wherein the level regulating valve is a pneumatic leveling valve and is mounted above the secondary suspension.

6. The railway truck leveling valve arrangement as in claim 1 wherein the bar is rigid and is connected between the axleboxes of the pair of wheelsets.

7. The railway truck leveling valve arrangement as in claim 6 wherein the bar includes a telescoping device to accomodate small longitudinal motions which may occur between the connected axleboxes.

8. A railway truck leveling valve arrangement for improved railway car height control comprising:
- a pneumatic level regulating valve connected to and mounted above a secondary suspension,
- a bar having ends attached to unsprung elements of a pair of railway truck wheelsets, the railway truck wheelsets positioned below a primary suspension, the bar having a telescoping device, and
- linkage means for connecting the level regulating valve and the bar,
- whereby the pneumatic level regulating valve senses deflection in both the primary and secondary suspensions and signals the secondary suspension to compensate for both deflections, thereby correcting the railway car height.

9. The railway truck leveling valve arrangement as in claim 8 wherein the secondary suspension is an air spring for supporting a railway car body for providing passenger ride comfort and is mounted between a railway truck frame and a railway truck bolster.

10. The railway truck leveling valve arrangement as in claim 8 wherein the primary suspension is an elastomeric spring disposed between a railway truck frame and the axlebox for providing wheel load equalization and shock absorption of forces caused by the railway car traversing uneven railroad track.

11. The railway truck leveling valve arrangement as in claim 8 wherein the primary suspension is a steel spring disposed between a railway truck frame and the axlebox for providing wheel load equalization and shock absorption of forces caused by the railway car traversing uneven railroad track.

12. The railway truck leveling valve arrangement as in claim 8 wherein the bar is rigid.

13. A railway vehicle suspension arrangement for railway car leveling including a primary suspension and a secondary suspension, the primary suspension including primary spring means for providing wheel load equalization, the secondary suspension including an air spring for supporting a railway car body, the improvement comprising:
- a rigid bar having ends attached to a pair of railway truck axleboxes, the pair of railway truck axleboxes mounted to a pair of railway truck wheelsets, the primary suspension disposed between the pair of railway truck axleboxes and a railway truck frame which is suspended on the pair of railway truck wheelsets for providing shock absorption of forces created by the railway vehicle traversing uneven railroad track,
- a level regulating valve operatively connected to the secondary suspension, and
- a leveling valve linkage connected between the level regulating valve and the rigid bar,
- whereby the level regulating valve senses both the spring deflection of the air spring of the secondary suspension and the spring deflection of the primary spring means of the primary suspension via the leveling valve linkage connected to the rigid bar which is mounted between the axleboxes and signals the secondary suspension to correct the total deflection, thereby correcting the railway car height.

14. The railway truck as in claim 13 wherein the level regulating valve is a pneumatic leveling valve and is mounted above the secondary suspension.

15. The railway truck as in claim 13 wherein the primary spring means is an elastomeric spring.

16. The railway truck as in claim 13 wherein the primary spring means is a steel spring.

17. The railway truck as in claim 13 wherein the secondary suspension is mounted between the railway truck frame and a railway truck bolster.

18. A railway truck including a truck frame mounted on at least two wheelsets coupled to one another by the truck frame, each wheelset having an axle which has axle ends mounted in respective axleboxes, a truck bolster which has truck bolster ends, the truck bolster supported by the truck frame, comprising:
- a primary suspension for providing wheel load equalization comprising an elastomeric spring for each wheelset located adjacent each axle end of each wheelset and positioned between the axlebox and the truck frame,
- a secondary suspension for supporting a railway car body comprising an air spring positioned between each truck bolster end and the truck frame,
- a pneumatic level regulating valve positioned above the secondary suspension,
- a rigid bar mounted between the axlebox of one of the wheelsets to the axlebox of the other of the wheelsets, the rigid bar having a telescoping device, and
- a leveling valve linkage coupling the rigid bar to the level regulating valve,
- whereby the level regulating valve senses both the spring deflection of the secondary suspension air spring and spring deflection of the primary suspension elastomeric spring via the rigid bar mounted between the axleboxes and signals the secondary suspension to correct the total deflection, thereby correcting the railway car height.

19. The railway truck as in claim 18 wherein the primary suspension comprises a steel spring.

* * * * *

UNITED STATES PATENT AND TRADEMARK OFFICE
CERTIFICATE OF CORRECTION

PATENT NO. : 5,947,031
DATED : Sep. 7, 1999
INVENTOR(S) : Polley

It is certified that error appears in the above-identified patent and that said Letters Patent is hereby corrected as shown below:

Col. 2, ln. 15 reads "of maintain" and should read --of maintaining-- as in patent spec. pg. 5, ln 3.

Claim 3, ln. 2 reads "secondary suspension" and should read --primary suspension--

Signed and Sealed this

Fourteenth Day of March, 2000

Attest:

Attesting Officer

Q. TODD DICKINSON

Commissioner of Patents and Trademarks